United States Patent Office 2,893,992
Patented July 7, 1959

2,893,992

1,4-BENZODIAZEPINE 4-OXIDES

Leo Henryk Sternbach, Upper Montclair, N.J., assignor to Hoffmann-La Roche Inc., Nutley, N.J., a corporation of New Jersey No Drawing. Application May 15, 1958
Serial No. 735,381

19 Claims. (Cl. 260—239)

This invention relates to novel compounds having a 1,4-benzodiazepine 4-oxide structure, to a method for producing such compounds and to novel intermediates useful in making 1,4-benzodiazepine 4-oxides.

The compounds of this invention may be represented by the following structural formula:

(I) 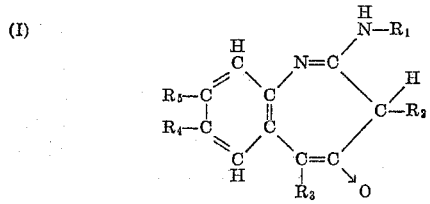

wherein $R_1$ represents hydrogen, lower alkyl, lower alkenyl, hydroxy-lower alkyl or lower alkoxy-lower alkyl, $R_2$ represents hydrogen or lower alkyl, $R_3$ represents phenyl, halophenyl, nitrophenyl or lower alkoxyphenyl, and $R_4$ and $R_5$ each represents hydrogen, halogen or lower alkyl.

The lower alkyl groups and lower alkenyl groups represented by the symbols R in the above formula include straight chain and branched chain groups such as methyl, ethyl, propyl, isopropyl, butyl, isobutyl, amyl isoamyl, allyl, butenyl, isobutenyl, etc.

A preferred group of compounds within the class represented by Formula I constitutes those represented by the following structural Formula II:

(II) 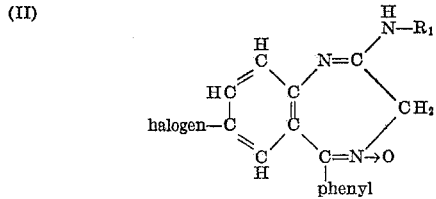

wherein $R_1$ has the same significance as in Formula I.

A still more preferred group of compounds constitutes those represented by Formula III:

(III) 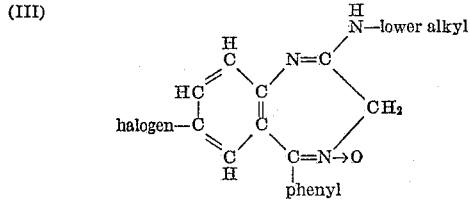

Another particular preferred group of compounds constitutes those represented by Formula IV:

(IV) 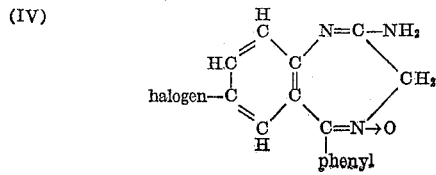

The compounds represented by Formulas I to IV inclusive form salts with acids such as the mineral acids, for example, the hydrohalic acids, sulfuric acid, nitric acid, phosphoric acid and the like, and the salts are also within the scope of this invention.

The method for synthesizing the compounds described above is also a feature of this invention. The compounds represented by Formula I above may be synthesized by reacting a compound represented by the following Formula V:

(V) 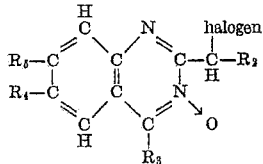

wherein $R_2$, $R_3$, $R_4$ and $R_5$ have the same significance as in Formula I with ammonia or with a primary amine, whereby rearrangement occurs and the pyrimidine ring of V is enlarged to the 1,4-diazepine structure of Formulae I to IV. The process is carried out preferably at room temperature in water or an inert organic solvent such as lower aliphatic alcohols, dioxane, tetrahydrofuran, etc. Primary amines which may be used to react with compounds of Formula V include alkyl- or alkenylamines, preferably acyclic lower alkyl- or lower alkenylamines which may be further substituted by hydroxy, alkoxy, or other groups. These primary amines may be, for example, methylamine, ethylamine, propylamine, isopropylamine, allylamine, ethanolamine, propanolamine, methoxyethylamine, ethoxybutylamine, etc. A preferred class of amines constitutes those represented by the formula $R_1$—$NH_2$ wherein $R_1$ represents hydrogen, lower alkyl, lower alkenyl, hydroxy-lower alkyl or lower alkoxy-lower alkyl.

In order to prepare the preferred group of compounds of Formulae II, III, and IV, the starting material is a compound represented by the Formula VI:

(VI) 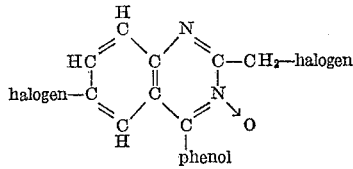

but 6-chloro-2-chloromethyl-4-phenylquinazoline 3-oxide and the hydrohalides thereof, are especially preferred.

Compounds corresponding to Formula V above are novel compounds which also form part of this invention. They may be synthesized by converting an ortho-aminobenzophenone to its oxime with hydroxylamine, acylating the oxime to the α-haloacyl-ortho-amino-benzophenone oxime, e.g. with an α-haloacyl halide such as chloroacetyl chloride and dehydrating the product thus obtained by the action of such acid agents as hydrogen chloride, concentrated sulfuric acid, etc., whereby ring closure occurs.

The compounds of this invention are useful as sedatives. The substances may be administered orally or parenterally in the form of the base or medicinally acceptable salts thereof in conventional dosage forms such as tablets, capsules, powders, injectables, etc. The compounds are also useful to increase the appetite in animals.

The following examples are illustrative of the invention. All temperatures are stated in degrees centigrade and are corrected.

Example 1

A mixture of 202 g. 2-amino-5-chlorobenzophenone, 190 g. hydroxylamine hydrochloride, 500 cc. pyridine and 1200 cc. alcohol was refluxed for 16 hours, then concentrated in vacuo to dryness. The residue was treated with a mixture of ether and water. The water was separated, the ether layer containing a considerable amount of precipitated reaction product was washed with some water and diluted with petroleum ether. The crystalline reaction product, 2-amino-5-chlorobenzophenone-α-oxime, was filtered off. The product was recrystallized from a mixture of ether and petroleum ether forming colorless prisms, M.P. 164–167°.

The ether-petroleum ether mother liquor was concentrated, the residue was dissolved in ether and washed several times with water in order to remove all the pyridine. The ether solution was dried with sodium sulfate, filtered, diluted with petroleum ether and kept at 0° for 20 hours. The precipitated crystals comprising a mixture of α- and β-oximes were filtered off and set aside. The mother liquor was concentrated until a syrupy residue remained. The syrup containing a crystalline precipitate was filtered. The filtered precipitate was recrystallized from a mixture of ether-petroleum ether to obtain prisms of 2-amino-5-chlorobenzophenone-β-oxime, M.P. 129–132°.

*Example 2*

Into a stirred, cooled (10–15°) solution of 26.2 g. (0.1 mol) 2-amino-5-chlorobenzophenone-α-oxime in 150 cc. dioxane were introduced in small portions 12.4 g. (0.11 mol) chloroacetyl chloride and an equivalent amount fo 3 N sodium hydroxide. The chloroacetyl chloride and sodium hydroxide were introduced alternately at such a rate so as to keep the temperature below 15° and the mixture neutral or slightly alkaline. The reaction was completed after 30 minutes. The mixture was slightly acidified with hydrochloric acid, diluted with water and extracted with ether. The ether extract was dried and concentrated in vacuo. Upon the addition of ether to the oily residue, the product, 2-chloroacetamido-5-chlorobenzophenone oxime, crystallized in the form of colorless plates, M.P. 165–167°.

*Example 3*

To a warm solution (50°) of 172.5 g. (0.7 mol) of 2-amino-5-chlorobenzophenone-α-oxime in 1 liter glacial acetic acid were added 110 cc. (1.47 mols) chloroacetyl chloride. The mixture was heated for 10 minutes at 50° and then stirred at room temperature for 15 hours. The precipitated yellow prisms, 2-chlorobethyl-4-phenyl-6-chloroquinazoline 3-oxide hydrochloride, were filtered off, melting range 128–150°, with dec.

The acetic acid mother liquor, containing the rest of the reaction product, was concentrated in vacuo. The residue was dissolved in methylene chloride and washed with ice cold sodium carbonate solution. The organic solution was dried, concentrated in vacuo to a small volume and diluted with ether and petroleum ether. Fine yellow needles of 2-chloromethyl-4-phenyl-6-chloroquinazoline 3-oxide precipitated. The pure base was recrystallized from a mixture of methylene chloride, ether and petroleum ether, M.P. 133–134°.

*Example 4*

A solution of 1 g. of 2-chloroacetamido-5-chlorobenzophenone oxime in 25 cc. acetic acid was saturated with hydrogen chloride gas. The mixture warmed up to about 60° and was left at room temperature for 16 hours. The mixture was then concentrated in vacuo. The residue consisted of pure 2-chloromethyl-4-phenyl-6-chloroquinazoline 3-oxide.

*Example 5*

98 g. of 6-chloro-2-chloromethyl-4-phenylquinazoline 3-oxide hydrochloride were introduced into 600 cc. of ice cold 25% methanolic methylamine. The mixture was initially cooled to about 30° and then stirred at room temperature. After 15 hours the reaction product which precipitated was filtered off. The mother liquor was concentrated in vacuo to dryness. The residue was dissolved in methylene chloride, washed with water and dried with sodium sulfate. The methylene chloride solution was concentrated in vacuo and the crystalline residue was boiled with a small amount of acetone to dissolve the more soluble impurities. The mixture fas then cooled at 5° for 10 hours and filtered. The crystalline product, 7-chloro-2-methylamino-5-phenyl-3H-1,4-benzodiazepine 4-oxide, was recrystallized from ethanol forming light yellow plates, M.P. 236–236.5°.

A solution of 7-chloro-2-methylamino-5-phenyl-3H-1,4-benzodiazepine 4-oxide in an equivalent amount of methanolic hydrochloric acid was diluted with ether and petroleum ether. The precipitated hydrochloride was filtered off and recrystallized from methanol, M.P. 213–213°.

*Example 6*

A suspension of 40 g. 6-chloro-2-chloromethyl-4-phenyl-quinazoline 3-oxide in 400 cc. 15% ethanolic ammonia was stirred for 5 hours at room temperature. The precipitated 7-chloro-2-amino-5-phenyl-3H-1,4-benzodiazepine 4-oxide was filtered off and washed with water and ether. The product was recrystallized from methanol forming slightly yellowish prisms, M.P. 255–256°.

A solution of the base in an equivalent amount of 1 N methanolic hydrochloric acid was diluted with ether and petroleum ether. 7 - chloro - 2 - amino - 5 - phenyl - 3H - 1,4-benzodiazepine 4-oxide hydrochloride precipitated as colorless, water soluble plates, M.P. 245–246°.

*Example 7*

A suspension of 20 g. 6-chloro-2-chloromethyl-4-phenyl-quinazoline 3-oxide in 100 cc. 33% ethanolic ethylamine was stirred for 14 hours at room temperature. The precipitated reaction product was then filtered off and recrystallized from acetone. The product, 7-chloro-2 - ethylamino - 5 - phenyl - 3H - 1,4 - benzodiazepine 4-oxide, formed slightly yellowish prisms, M.P. 231–233°.

A solution of the base in an equivalent amount of ethanolic hydrochloric acid was diluted with ether and petroleum ether. 7 - chloro - 2 - ethylamino-5-phenyl-3H-1,4-benzodiazepine 4-oxide hydrochloride precipitated as colorless, water soluble prisms, M.P. 208–209°.

*Example 8*

A solution of 15 g. 6-chloro-2-chloromethyl-4-phenyl-quinazoline 3-oxide in 60 cc. methanol and 30 cc. n-butylamine was left at room temperature for 14 hours. The reaction product which had precipitated was filtered off and the mother liquor was concentrated in vacuo. The residue was dissolved in an excess of dilute ice cold hydrochloric acid. The neutral impurities were extracted with ether and discarded. The mixture was then made alkaline with ice cold sodium hydroxide solution and the basic products were extracted into ether. The ether solution was concentrated to a small volume and was left for the product to crystallize. The 7-chloro-2-butylamino-5-phenyl-3H-1,4-benzodiazepine 4-oxide thus obtained was crystallized from acetone as slightly yellow prisms, M.P. 202–203°.

A solution of 7 - chloro - 2 - butylamino - 5 - phenyl-3H-1,4-benzodiazepine 4-oxide in an equivalent amount of 1 N methanolic hydrochloric acid was diluted with acetone, ether and petroleum ether. The precipitated product was recrystallized from isopropanol with the addition of acetone and ether. The hydrochloride formed thin colorless plates, M.P. 171–173°.

*Example 9*

A solution of 30 g. 6-chloro-2-chloromethyl-4-phenyl-quinazoline 3-oxide in a cooled mixture of 120 cc. methanol and 60 cc. allylamine was left at room temperature for 24 hours. The precipitated 7-chloro-2-allylamino-5-phenyl-3H-1,4-benzodiazepine 4-oxide was filtered off. The mother liquor was concentrated in vacuo and the residue was dissolved in ice cold 1 N hydrochloric acid. Neutral impurities were extracted with ether. The acid aqueous part was made alkaline with the addition of ice cold sodium hydroxide solution and the basic reaction product was extracted with ether. The ether layer was dried with sodium sulfate, concentrated in vacuo and the product crystallized upon the addition of acetone and petroleum ether, yielding additional crystals of 7-chloro-2-allylamino-5-phenyl-3H-1,4-benzodiazepine 4-oxide. The material was recrystallized from methanol, forming slightly yellowish prisms, M.P. 202–204°.

The base obtained as described above was dissolved in an equivalent amount of 1 N methanolic hydrochloric acid and the hydrochloride salt was precipitated by the addition of acetone, ether and petroleum ether. The hydrochloride was obtained in the form of colorless plates darkening at 180° and melting at 221–227°, with dec.

Example 10

A mixture of 10 g. 6-chloro-2-chloromethyl-4-phenylquinazoline 3-oxide, 40 cc. ethanolamine and 100 cc. methanol was stirred at room temperature for 18 hours. The solution was then diluted with ether and petroleum ether and left at 5° for 16 hours. The precipitated prisms which formed were filtered off and the mother liquor was concentrated in vacuo. The residue was dissolved in an excess of a mixture of ice and 3 N hydrochloric acid. The neutral impurities were extracted with ether and discarded. The aqueous part was made alkaline with ice cold 3 N sodium hydroxide solution and extracted with ether. The ether solution containing the basic reaction product, 7-chloro-2-hydroxyethylamino-5 - phenyl - 3H - 1,4 - benzodiazepine 4-oxide, was dried, concentrated in vacuo to a small volume and combined with the prisms previously obtained. The product was recrystallized from methanol forming slightly yellowish prisms, M.P. 216–218°.

A solution of 7-chloro-2-hydroxyethylamino-5-phenyl-3H-1,4-benzodiazepine 4-oxide in an equivalent amount of 1 N methanolic hydrochloric acid was diluted with ether and petroleum ether. The precipitated hydrochloride was filtered off and recrystallized from a mixture of methanol and ether, M.P. 210–211°, with dec.

Example 11

A solution of 12 g. 6-chloro-2-chloromethyl-4-phenylquinazoline 3-oxide in 70 cc. warm dioxane was cooled and combined with 30 cc. β-methoxyethylamine containing about 30% water. After standing 3 days at room temperature, the mixture was concentrated in vacuo and the residue was dissolved in ice cold 1 N hydrochloric acid. The neutral impurities were extracted with ether. The acidic aqueous portion was cooled, made alkaline with sodium hydroxide solution and the basic reaction product was extracted with ether. The ether layer was dried over sodium sulfate and quickly filtered. The filtrate was partially concentrated in vacuo and yielded a crystalline precipitate of the crude reaction product. The product, 7-chloro-2-methoxyethylamino-5-phenyl-3H-1,4-benzodiazepine 4-oxide, was purified by repeated crystallization from acetone, forming yellowish prisms, M.P. 225–226°.

The base, 7-chloro-2-methoxyethylamino - 5 - phenyl-3H-1,4-benzodiazepine 4-oxide, was dissolved in an equivalent amount of 1 N methanolic hydrochloric acid and the crystalline hydrochloride salt was precipitated by the addition of ether, M.P. 207–209°.

Example 12

24.6 g. (0.1 mol) 2-amino-5-chlorobenzophenone-α-oxime were dissolved with heating in 120 cc. glacial acetic acid. The solution was cooled and 34.2 g. (0.2 mol) α-bromopropionyl chloride were added while the temperature was kept at about 30°. After 48 hours at room temperature, the mixture was concentrated in vacuo. The residue was dissolved in methylene chloride and washed neutral with ice cold sodium carbonate solution. The methylene chloride solution was dried with sodium sulfate and partly concentrated in vacuo. 6-chloro-2-(α-bromoethyl) - 4 - phenylquinazoline 3-oxide precipitated in crystalline form upon the addition of ether and petroleum ether. The product was recrystallized from methylene chloride-petroleum ether, M.P. 183–184°.

Example 13

A solution of 7 g. 6-chloro-2-(α-bromoethyl)-4-phenylquinazoline 3-oxide in 30 cc. warm dioxane was cooled and added to an ice cold 20% solution of methylamine in dioxane. The mixture was left at room temperature for 48 hours and then concentrated to dryness in vacuo. Ether was added to the residue and the reaction product was extracted with ice cold dilute hydrochloric acid. The acid solution was made alkaline with sodium hydroxide solution and the basic reaction product was extracted with ether. The ether solution was dried, concentrated in vacuo and the residue was crystallized from acetone. 7-chloro-2-methylamino-3-methyl - 5 - phenyl-3H-1,4-benzodiazepine 4-oxide was obtained as slightly yellow prisms, M.P. 246–247°.

The base obtained as described above was dissolved in an equivalent amount of 1 N methanolic hydrochloric acid. 7-chloro-2-methylamino - 3 - methyl - 5 - phenyl-3H-1,4-benzodiazepine 4-oxide hydrochloride was precipitated by the addition of acetone, ether and petroleum ether and recrystallized from methanol by the addition of acetone and ether, M.P. 190–191°.

Example 14

To 400 g. of molten 3,4-dichloroaniline (80–100°) were added in portions 600 cc. benzoyl chloride with stirring. There was a strong evolution of hydrogen chloride. The stirring and heating were continued and at 180° 400 g. anhydrous zinc chloride were introduced. There was again an evolution of hydrogen chloride. The mixture was then heated for 1½ hours at 220–235°. After cooling to 120°, the mixture was treated with one liter of boiling 0.5 N hydrochloric acid. The mixture was stirred and refluxed for a few minutes, then cooled by the addition of ice. The aqueous layer was decanted and the residual resin was treated with one liter of boiling water. After cooling, the water was decanted and the resin was refluxed for 72 hours with a mixture of 2 liters of alcohol and 1 liter concentrated hydrochloric acid. A crystalline precipitate which formed was filtered off and discarded. The filtrate was concentrated in vacuo to a small volume. 300 cc. of alcohol were then added and sufficient 50% potassium hydroxide was added with heating so as to maintain an alkaline reaction. The mixture was stirred and heated for 2 hours. Part of the alcohol was distilled off and the reaction product was extracted with benzene. The benzene layer was washed with 1 N hydrochloric acid until the addition of alkali to the acid extract caused only a slight turbidity. The benzene layer was then washed with water, dried, concentrated in vacuo to a small volume and diluted with petroleum ether. The crude reaction product, 2-amino-4,5-dichlorobenzophenone, precipitated in yellow prisms. It was recrystallized from a mixture of alcohol and petroleum ether, M.P. 107–108°.

Example 15

A mixture of 106.5 g. (0.4 mol) 2-amino-4,5-dichlorobenzophenone, 108 g. hydroxylamine hydrochloride, 600 cc. alcohol and 200 cc. pyridine was stirred and refluxed for 24 hours. It was then concentrated in vacuo to a small volume, diluted with water and extracted with ether. The ether extract was washed with small amounts of 1 N hydrochloric acid as long as the neutralization of the acid extract with sodium hydroxide showed turbidity. The ether extract was dried and concentrated in vacuo. The dark oily residue was dissolved in ethanol and the solution was diluted with water to yield crude crystalline reaction product which was filtered off and purified by treatment with charcoal in ether. The product was precipitated in crystalline form from the ether solution by the addition of petroleum ether. The dilute alcohol and ether-petroleum ether mother liquors were combined, concentrated in vacuo and dissolved with heating in 5 N potassium hydroxide. After cooling, the potassium salt of 2-amino-4,5-dichlorobenzophenone oxime precipitated. The salt was filtered off and washed with ether, suspended in water and acidified to pH 5 with dilute hydrochloric acid. The 2-amino-4,5-dichlorobenzophenone oxime was extracted with ether and precipitated by the addition of petroleum ether. The product was recrystallized from a mixture of ether and petroleum ether in the form of colorless needles, M.P. 150–151°.

*Example 16*

To a solution of 15.5 g. (55.2 mols) 2-amino-4,5-dichlorobenzophenone oxime in 75 cc. acetic acid were added 8.4 cc. (110.8 millimols) chloroacetyl chloride. The mixture was left at room temperature for 14 hours, then heated to 60° for 30 minutes and concentrated in vacuo. The residue was dissolved in methylene chloride, washed with a mixture of 3 N sodium carbonate and ice, washed with water, dried and concentrated in vacuo to a small volume. Upon the addition of ether and petroleum ether, the product, 6,7-dichloro-2-chloromethyl-4-phenylquinazoline 3-oxide, crystallized in fine yellowish needles. The product was recrystallized from a mixture of methylene chloride, ether and petroleum ether, M.P. 159–160°.

*Example 17*

8 g. 6,7-dichloro-2-chloromethyl-4-phenylquinazoline 3-oxide were dissolved with stirring in 135 cc. of a 35% solution of methylamine in methanol. After standing 20 hours at room temperature, the crystalline reaction product was filtered off. The mother liquor was then concentrated in vacuo. The concentrate was dissolved in ice cold 1 N hydrochloric acid and washed with ether. The reaction product was precipitated from the acidic aqueous solution with ice cold alkali and extracted with ether. The ether solution was concentrated in vacuo and the remaining crystals were suspended in methanol and filtered off. The two batches of crude crystalline material, 7,8-dichloro-2-methylamino-5-phenyl-3H-1,4-benzodiazepine 4-oxide, were recrystallized from methanol, forming yellowish prisms melting at 233–234°.

To a suspension of 7,8-dichloro-2-methylamino-5-phenyl-3H-1,4-benzodiazepine 4-oxide in methanol was added an equivalent amount of methanolic hydrochloric acid. The solution was partly concentrated in vacuo and the crystalline hydrochloride was precipitated by the additon of ether and petroleum ether. Upon recrystallization from methanol by the addition of ether and petroleum ether, the colorless hydrochloric melted at 231–232°.

*Example 18*

A mixture of 66 g. 5-bromo-2-aminobenzophenone, 66 g. hydroxylamine hydrochloride, 350 cc. alcohol and 120 cc. pyridine was refluxed for 20 hours, then concentrated in vacuo to a small volume. To the mixture were added water, ether and petroleum ether. Crystals which formed were filtered off after several hours. After standing a few days, a second batch of crystals precipitated and were filtered off. The crystalline 5-bromo-2-aminobenzophenone oxime thus obtained was recrystallized from ether in the form of colorless prisms, M.P. 192–193°.

*Example 19*

To a warm suspension (50°) of 20.3 g. (70 millimols) 5-bromo-2-aminobenzophenone oxime in 100 cc. acetic acid were added 15.8 g. (140 millimols) chloroacetyl chloride. The solution was left at room temperature for 48 hours. The reaction mixture, containng large prisms of the reaction product, the hydrochloride of 6-bromo-2-chloromethyl-4-phenylquinazoline 3-oxide, was concentrated in vacuo. The residue was dissolved in methylene chloride and neutralized by shaking with an ice cold solution of sodium carbonate. The methylene chloride phase was separated, dried, concentrated in vacuo to a small volume and then diluted with petroleum ether. The product crystallized in the form of needles and was recrystallized from acetone. The 6-bromo-2-chloromethyl-4-phenylquinazoline 3-oxide melted at 189–190°.

*Example 20*

16.4 g. 6-bromo-2-chloromethyl-4-phenylquinazoline 3-oxide were stirred at room temperature with 80 cc. of a 30% solution of methylamine in methanol. The precipitated reaction product, 7-bromo-2-methylamino-5-phenyl-3H-1,4-benzodiazepine 4-oxide, was filtered off after 24 hours and recrystallized from acetone, M.P. 242–243°.

The base obtained as described above was dissolved in an equivalent amount of methanolic hydrochloric acid. The solution was concentrated in vacuo and the residue was crystallized from a mixture of methanol and ether. 7-bromo-2-methylamino-5-phenyl-3H-1,4-benzodiazepine 4-oxide hydrochloride was obtained in the form of colorless prisms, M.P. 239–240°, with dec.

*Example 21*

A suspension of 14 g. 6-bromo-2-chloromethyl-4-phenyl-quinazoline 3-oxide in 400 cc. 15% ethanolic ammonia was stirred at room temperature for 20 hours. The precipitated reaction product was filtered off and recrystallized from methanol. The 7-bromo-2-amino-5-phenyl-3H-1,4-benzodiazepine 4-oxide was obtained in the form of flat white needles, M.P. 261–262°.

8.8 g. of the base obtained as described above were suspended in 200 cc. methanol and treated with an equivalent amount of 5 N methanolic hydrochloric acid. The resulting solution was diluted with ether and petroleum ether. The fine needles which precipitated were filtered off and recrystallized from methanol by the addition of ether and petroleum ether. The 7-bromo-2-amino-5-phenyl-3H-1,4-benzodiazepine 4-oxide hydrochloride was obtained in the form of fine needles, M.P. 243–244°.

*Example 22*

To a warm solution (50°) of 70 g. (.33 mol) of a mixture of the α- and β-oximes of 2-aminobenzophenone in 400 cc. of glacial acetic acid were added 74.5 g. (.66 mol) of chloroacetyl chloride. The mixture was left at room temperature for 14 hours, saturated with hydrogen chloride gas and concentrated in vacuo. Ether was added, and the precipitated crystals of 2-chloromethyl-4-phenylquinazoline 3-oxide were filtered off. The mother liquor containing the rest of the reaction product was concentrated in vacuo. The residue was dissolved in methylene chloride and washed with ice cold sodium carbonate solution. The organic solution was dried, concentrated to a small volume and diluted with petroleum ether, yielding an additional amount of the reaction product. The 2-chloromethyl-4-phenylquinazoline 3-oxide was recrystalized from a mixture of methylene chloride and petroleum ether, forming yellow needles melting at 160–161°.

*Example 23*

25 g. of 2-chloromethyl-4-phenylquinazoline 3-oxide were introduced into 200 cc. of ice cold 25% methanolic methylamine. The mixture was stired at room temperature for 15 hours and then concentrated in vacuo. Ether was added to the residue and the precipitated crystals were filtered off and washed with water and ether. After recrystallization from acetone, the pure 2-methyl-amino-5-phenyl-3H-1,4-benzodiazepine 4-oxide formed rosettes of colorless needles melting at 190–191°.

A solution of 2-methylamino-5-phenyl-3H-1,4-benzodiazepine 4-oxide in an equivalent amount of 1 N methanolic hydrochloric acid was diluted with acetone, ether and petroleum ether. The precipitated hydrochloride was filtered off and recrystallized from the same mixture of solvents. The pure hydrochloride formed colorless prisms melting at 225–226°.

*Example 24*

A mixture of 90 g. crude 2-amino-5-methylbenzophenone, 90 g. hydroxylamine hydrochloride, 50 cc. pyridine and 400 cc. alcohol was refluxed for 16 hours, then partly concentrated in vacuo. To the residue some methanol, water, ether, and petroleum ether were added. The mixture was stirred until a considerable amount of crystalline precipitate was formed. The crystals were filtered off and washed with a mixture of ether and petroleum ether. The ether-petroleum ether layer of the filtrate was separated, washed with water, dried and concentrated in vacuo. The residue was crystallized from ether and petroleum ether. The pure 2-amino-5-methylbenzophenone oxime, after crystallization from a mixture of ethanol and petroleum ether, formed colorless prisms melting at 186–187°.

*Example 25*

To a warm solution (50°) of 33.9 g. (.15 mol) of 2-amino-5-methylbenzophenone oxime in 150 cc. glacial acetic acid were added 33.8 g. (.3 mol) of chloroacetyl chloride. The mixture was left at room temperature for 16 hours, then heated to 60° for 30 minutes and concentrated in vacuo to dryness. The residual oil was dissolved in methylene chloride and the solution was washed with ice cold aqueous sodium carbonate. The organic solution was dried, concentrated to a small volume and the 6-methyl-2-chloromethyl-4-phenylquinazoline 3-oxide was precipitated by the addition of ether. After crystallization from a mixture of methylene chloride and ether, the product formed long plates melting at 152–153°.

*Example 26*

A solution of 15 g. of 6-methyl-2-chloromethyl-4-phenyl-quinazoline 3-oxide in 50 cc. benzene was added to 150 cc. 35% methanolic methylamine. The mixture was left at room temperature for 16 hours and then concentrated in vacuo to dryness. The residue was dissolved in an excess of dilute ice cold hydrochloric acid and neutral impurities were extracted with ether and discarded. The mixture was then made alkaline with ice cold sodium hydroxide solution and the basic reaction product was extracted with ether. The ether solution was dried and concentrated in vacuo and the residue was crystallized from acetone with the addition of petroleum ether. The product, 7-methyl-2-methylamino-5-phenyl-3H-1,4-benzodiazepine 4-oxide, was recrystallized from acetone, forming slightly yellow prisms melting at 214–215°.

The base obtained above was dissolved in an equivalent amount of 1 N methanolic hydrochloric acid. The solution was concentrated in vacuo and the residue was crystallized from a small amount of methanol with the addition of acetone, ether and petroleum ether. The pure hydrochloride of 7-methyl-2-methylamino-5-phenyl-3H-1,4-benzodiazepine 4-oxide formed colorless rhombic prisms melting at 224–225°.

*Example 27*

A solution of 70 g. 2-amino-4,5-dimethylbenzophenone and 70 g. hydroxylamine hydrochloride in 120 cc. pyridine and 400 cc. alcohol was refluxed for 3 hours. The mixture was then partly concentrated in vacuo, diluted with some water, cooled and scratched. After crystallization started, additional amounts of water were added. The mixture was cooled to 5° for 20 hours and the precipitated crystals were filtered off. The crude 2-amino-4,5-dimethylbenzophenone α-oxime softened at 120° and melted at 173–177°. A larger amount of crude oxime was recrystallized from a mixture of dioxane and petroleum ether. The precipitated prisms melting around 180° were filtered off. After recrystallization from a mixture of ether and petroleum ether, the product formed pale yellow prisms melting at 183–184°.

The dioxane-petroleum ether mother liquor was concentrated in vacuo and the residue was crystallized from ether with the addition of petroleum ether. The mixture of prisms and needles which precipitated was filtered off and separated mechanically. The needles were recrystallized from a mixture of ether and petroleum ether. The product, 2-amino-4,5-dimethylbenzophenone β - oxime, formed slightly yellow needles melting at 124–125°.

*Example 28*

To a stirred solution of 7.2 g. 2-amino-4,5-dimethylbenzophenone oxime (30 millimols) in 300 cc. ether were added 50 cc. water and then alternately, with outside ice cooling, 2.5 cc. (33 millimols) chloroacetyl chloride and 11 cc. 3 N sodium hydroxide in such a manner as to keep the solution neutral. The precipitated pure reaction product, 2-chloroacetamino-4,5-dimethylbenzophenone oxime, was filtered off, the ether layer was separated and concentrated in vacuo and the residue was recrystallized from a mixture of dioxane and petroleum ether, M.P. 182–183°.

*Example 29*

To a warm (50°) solution of 30 g. (.125 mol) of a mixture of the α- and β-oximes of 2-amino-4,5-dimethylbenzophenone in 300 cc. glacial acetic acid were added 18.8 cc. (.25 mol) chloroacetyl chloride. The mixture was left at room temperature for 14 hours and concentrated in vacuo. After crystallization from benzene, the 6,7-dimethyl-2-chloromethyl-4-phenylquinazoline 3-oxide formed yellow needles or prisms melting at 169–170°.

The same product was obtained by treating a solution of 2-chloroacetamino-4,5-dimethylbenzophenone oxime in glacial acetic acid with hydrogen chloride.

*Example 30*

A suspension of 10 g. of 6,7-dimethyl-2-chloromethyl-4-phenylquinazoline 3-oxide in 100 cc. 35% methanolic methylamine was stirred for 16 hours at room temperature. The precipitated 7,8-dimethyl-2-methylamino-5-phenyl-3H-1,4-benzodiazepine 4-oxide was filtered off and recrystallized from acetone, forming slightly yellowish prisms melting at 259–261°.

The base was dissolved in an equivalent amount of 1 N methanolic hydrochloric acid. The solution was concentrated in vacuo to a small volume and diluted with acetone. The 7,8-dimethyl-2-methylamino-5-phenyl-3H-1,4-benzodiazepine 4-oxide hydrochloride which precipitated in colorless prisms was filtered off and washed with acetone and ether, M.P. 230–231°.

*Example 31*

A mixture of 82 g. of 2-amino-4'-methoxybenzophenone, 90 g. hydroxylamine hydrochloride, 150 cc. pyridine, and 400 cc. alcohol was refluxed for 16 hours. The mixture was then concentrated to dryness and diluted with water and ether. The aqueous layer was separated and discarded. The ether solution was washed several times with water, separated, and diluted with petroleum ether. The reaction product which had crystallized out was filtered off after two days and purified by treatment with charcoal in boiling methanol. The hot solution was filtered and concentrated. The product, 2-amino-4'-methoxybenzophenone oxime, precipitated in colorless prisms which were recrystallized from methanol, M.P. 123–126°.

Example 32

To a warm solution (50°) of 48.4 g. (.2 mol) of 2-amino-4'-methoxybenzophenone oxime in 500 cc. acetic acid were added 47.4 g. (.42 mol) of chloroacetyl chloride. The mixture was left at room temperature for 72 hours. The precipitated yellow prisms of the hydrochloride of 2-chloromethyl-4-(p-methoxyphenyl)-quinazoline 3-oxide were filtered off, M.P. 175–177°.

The free base, 2-chloromethyl-4-(p-methoxyphenyl)-quinazoline 3-oxide, was prepared by suspending the hydrochloride in methylene chloride and treating it with an excess of dilute ice cold aqueous sodium hydroxide solution. The methylene chloride solution was separated, dried, concentrated in vacuo and the residue was recrystallized from methylene chloride with the addition of petroleum ether, M.P. 179–180°.

The acetic acid mother liquor, after the removal of the hydrochloride of 2-chloromethyl-4-(p-methoxyphenyl)-quinazoline 3-oxide, was concentrated in vacuo to dryness, the residue was dissolved in methylene chloride and washed with ice cold sodium carbonate solution. The organic solution was dried and partly concentrated in vacuo. The crystalline material, 2-chloroacetamino-4'-methoxybenzophenone oxime, which precipitated from this solution was filtered off and melted at 167–169°. This product was converted into the hydrochloride of 2-chloromethyl-4-(p-methoxyphenyl)-quinazoline 3 - oxide by treatment with hydrogen chloride gas, in a glacial acetic acid solution.

Example 33

15 g. of 2-chloromethyl-4-(p-methoxyphenyl)-quinazoline 3-oxide were introduced with stirring into 150 cc. 35% methanolic methylamine. Complete solution occurred after 20 minutes. The solution was concentrated in vacuo after two hours and water and ether were added to the residue. The precipitated crystals were filtered off. After recrystallization from a mixture of ethanol and petroleum ether, the 2-methylamino-5-(p - methoxyphenyl)-3H-1,4-benzodiazepine 4-oxide formed colorless prisms melting at 251–252°.

A solution of the above base in an equivalent amount of 1 N methanolic hydrochloric acid was concentrated in vacuo and the residue crystallized from a small amount of methanol with the addition of acetone and ether. The thus obtained hydrochloride of 2-methylamino-5-(p-methoxyphenyl)-3H-1,4-benzodiazepine 4 - oxide formed colorless rosettes of plates melting at 218–219°.

Example 34

A mixture of 130 g. of 2-amino-4,5-dimethyl-4'-chlorobenzophenone, 130 g. of hydroxylamine hydrochloride, 700 cc. of alcohol, and 240 cc. of pyridine was refluxed for 17 hours. The mixture was concentrated in vacuo to a small volume, diluted with water and again concentrated in order to remove most of the pyridine. Benzene was added, and the part of the reaction product which had precipitated was filtered off. The benzene layer was then separated from the water, dried and concentrated in vacuo to dryness. The residue was crystallized from a mixture of ether and petroleum ether and yielded an additional amount of the reaction product. After recrystallization from ether and petroleum ether, the 2-amino-4,5-dimethyl-4'-chlorobenzophenone oxime formed colorless needles melting at 156–157°.

Example 35

To a warm solution (50°) of 90 g. (.33 mol) of the 2-amino-4,5-dimethyl-4'-chlorobenzophenone oxime in 500 cc. glacial acetic acid were added 74.5 g. (.66 mol) of chloroacetyl chloride. The mixture was stirred at room temperature for 16 hours, then hydrogen chloride was introduced for ½ hour. The solution was concentrated in vacuo and the residue was dissolved in methylene chloride and washed with ice cold sodium carbonate solution. The organic solution was dried, concentrated in vacuo to a small volume, diluted with acetone and concentrated at atmospheric pressure in order to remove most of the methylene chloride. The reaction product crystallized in prisms. The 6,7-dimethyl-2-chloromethyl-4-(p-chlorophenyl)-quinazoline 3-oxide crystallized from acetone in yellow prisms melting at 192–192°.

Example 36

A suspension of 25 g. of 6,7-dimethyl-2-chloromethyl-4-(p-chlorophenyl)-quinazoline 3-oxide in 250 cc. of 30% methanolic methylamine was stirred at room temperature for 15 hours. The precipitated 7,8-dimethyl-2-methylamino-5-(p-chlorophenyl)-3H-1,4-benzodiazepine 4-oxide was filtered off and recrystallized from methanol, M.P. 258–259°.

The base was suspended in a 20-fold amount of methanol and dissolved by the addition of an equivalent amount of 1 N methanolic hydrochloric acid. The solution was concentrated in vacuo and the residue was recrystallized from a small amount of water with adition of ethanol, acetone and ether. The 7,8-dimethyl-2-methylamino-5-(p-chlorophenyl)-3H-1,4-benzodiazepine 4-oxide hydrochloride formed colorless needles melting at 247–248°.

I claim:

1. A compound selected from the group represented by the formula

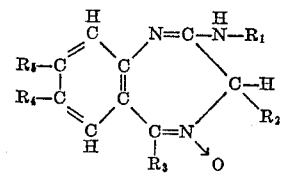

wherein $R_1$ represents a member of the group consisting of hydrogen, lower alkyl, lower alkenyl, hydroxy-lower alkyl and lower alkoxy-lower alkyl, $R_2$ represents a member of the group consisting of hydrogen and lower alkyl, $R_3$ represents a member of the group consisting of phenyl, halophenyl, nitrophenyl and lower alkoxyphenyl, and $R_4$ and $R_5$ each represents a member of the group consisting of hydrogen, halogen and lower alkyl, and acid addition salts thereof.

2. A compound represented by the formula

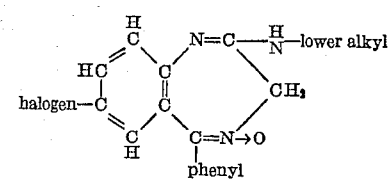

3. A compound represented by the formula

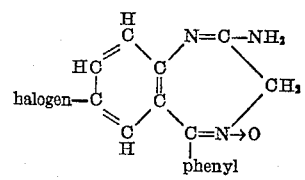

4. 7-halo-2-methylamino-5-phenyl - 3H - 1,4 - benzodiazepine 4-oxide.

5. 7-chloro-2-methylamino-5-phenyl-3H - 1,4 - benzodiazepine 4-oxide.

6. 7-halo-2-lower alkylamino-5-phenyl-3H-1,4-benzodiazepine 4-oxide hydrohalide.

7. 7-chloro-2-methylamino-5-phenyl-3H-1,4 - benzodiazepine 4-oxide hydrochloride.

8. 7-chloro-2-amino-5-phenyl-3H-1,4-benzodiazepine 4-oxide.

9. 7-bromo-2-amino-5-phenyl-3H-1,4-benzodiazepine 4-oxide.

10. A method which comprises reacting a compound represented by the structural formula

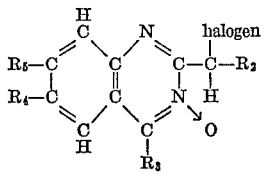

wherein $R_2$ represents a member of the group consisting of hydrogen and lower alkyl, $R_3$ represents a member of the group consisting of phenyl, halophenyl, nitrophenyl and lower alkoxyphenyl, and $R_4$ and $R_5$ each represents a member of the group consisting of hydrogen, halogen and lower alkyl, with a member of the group consisting of ammonia and primary amine.

11. A method which comprises reacting 6-halo-2α-halo-lower alkyl-4-phenylquinazoline 3-oxide with a compound represented by the formula $R_1$—$NH_2$, wherein $R_1$ is a member of the group consisting of hydrogen, lower alkyl, lower alkenyl, hydroxy-lower alkyl and lower alkoxy-lower alkyl.

12. A method which comprises reacting 6-halo-2-halomethyl-4-phenylquinazoline 3-oxide with a lower alkylamine.

13. A method which comprises reacting 6-chloro-2-chloromethyl-4-phenylquinazoline 3-oxide with methylamine.

14. A compound represented by the formula

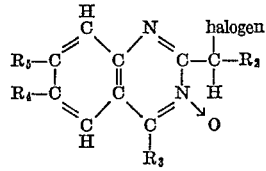

wherein $R_2$ represents a member of the group consisting of hydrogen and lower alkyl, $R_3$ represents a member of the group consisting of phenyl, halophenyl, nitrophenyl and lower alkoxyphenyl, and $R_4$ and $R_5$ each represents a member of the group consisting of hydrogen, halogen and lower alkyl.

15. A compound represented by the formula

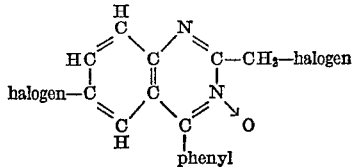

16. 6-halo-2α-halo-lower alkyl-4-phenylquinazoline 3-oxide.

17. 6-chloro-2 - chloromethyl - 4 - phenylquinazoline 3-oxide.

18. 2-haloacetamido-5-chlorobenzophenone oxime.

19. 2-chloroacetamido-5-chlorobenzophenone oxime.

No references cited.